Feb. 21, 1928.
O. F. BAUGHMAN ET AL
1,659,986
ELECTRIC STOVE
Filed April 2, 1925
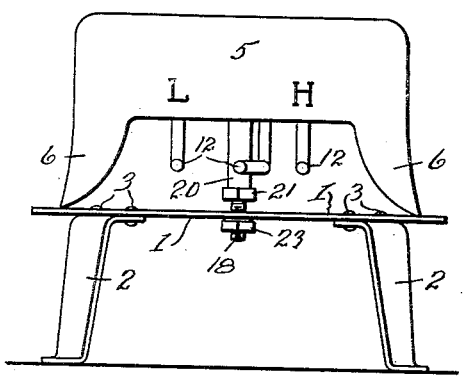
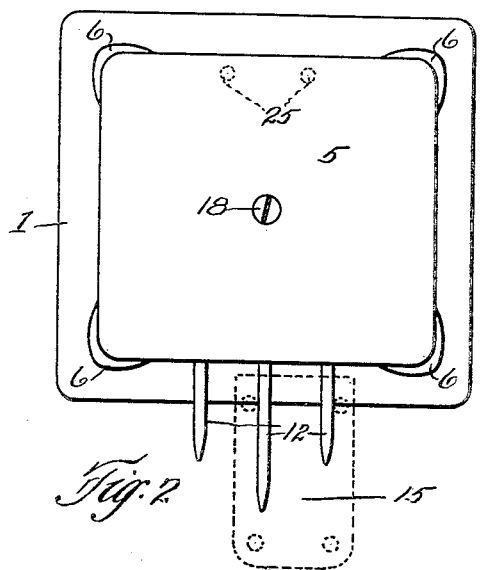
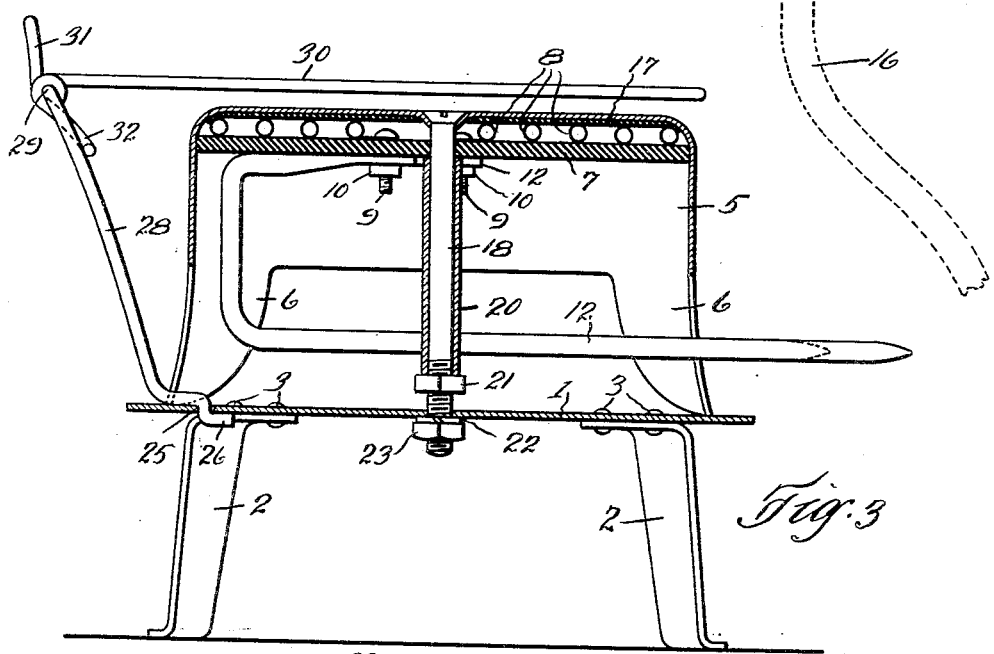
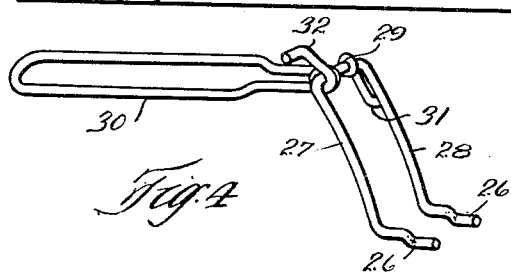
Inventors
Orland F. Baughman
and Lawrence W. Cady
By Hull, Brock & West
Attys.

Patented Feb. 21, 1928.

1,659,986

UNITED STATES PATENT OFFICE.

ORLAND F. BAUGHMAN AND LAWRENCE W. CADY, OF LAKEWOOD, OHIO, ASSIGNORS TO THE BANKERS SAVINGS & CREDIT SYSTEM COMPANY, OF CLEVELAND, OHIO, A CORPORATION OF OHIO.

ELECTRIC STOVE.

Application filed April 2, 1925. Serial No. 20,159.

This invention relates to an electric stove, and its objects are to provide a device of this character which, though very simple of construction, is highly efficient; is capable of producing different degrees of heat; is suited to many purposes; and is so constructed that the heating element is entirely enclosed and protected from boiled-over liquids and foods, as well as from dust, and is so supported with respect to the base of the stove and so ventilated that practically no heat is conducted to the object on which the stove stands.

A further object of the invention is to so design the stove that the manufacture of the parts is greatly expedited and their assembly likewise facilitated.

Another object is to provide a handle which is preferably removably connected to the stove and by means of which the stove may be conveniently lifted from place to place while it is hot, and which handle is so constructed that it may be disposed above the operating surface of the stove, where it serves to support bread for toasting.

The foregoing objects, with others hereinafter appearing, are attained in the construction illustrated in the accompanying drawing wherein Fig. 1 is an elevational view, and Fig. 2 a plan view, of the stove; Fig. 3 is a central vertical section through the stove with the handle attached thereto and in the position wherein it serves as a support for bread while being toasted, the view being at right angles to Fig. 1 and on a larger scale, and the handle being shown in elevation notwithstanding the central plane of section through the stove; and Fig. 4 is a perspective view of the handle.

The base of the stove is comprised of a flat rectangular plate 1 that is supported at its corners by legs 2 which are shown as secured to the base by rivets 3. The top portion of the stove is constituted of a shell 5 which is preferably drawn from a piece of sheet metal in the form of an inverted pan and at each corner is provided with an ear 6 which bears upon the base and has only a slight surface contact therewith.

Situated well up within the shell 5 is a slab 7 of suitable insulating material, such as asbestos board or the like, and carried solely by this slab are the resistor coils 8 which constitute the heating element. There is nothing particularly novel in the arrangement of these coils, and their terminals are connected to screws 9 which extend downwardly through the slab 7 and have clamped to their lower ends, as by nuts 10, the inner ends of elongated terminal members 12, such ends being formed to provide eyes which are engaged over the screws 9 in a well known manner. The members 12 are made of suitable wire having high conductivity and considerable rigidity so that when formed and mounted as shown their free ends will be firmly held against material displacement. It is desirable, however, that said ends yield to a limited degree so as to readily adapt themselves to slightly different fittings. As will be observed from Figs. 1 and 2, there are three terminal members 12, spaced substantially like distances apart, and the middle one is considerably longer than the side ones. The middle terminal member and one or the other of the side ones are adapted to be received by the sockets of a terminal block 15 of an electrical conductor 16, and when the block is engaged with the middle and the right hand members (as the stove is viewed in Fig. 1) it will establish a circuit through all coils of the heating element, thus producing "high" heat, as indicated by the letter "H" appearing on the stove top in Fig. 1; and when the block is withdrawn from the right hand member and rotated on the middle member and then forced onto the left hand member it will establish a circuit through only a part of the coils 8, thus effecting "low" heat, as indicated by the letter "L" in Fig. 1.

A layer 17 of suitable insulating material, such as mica, is placed between the heating element and the top wall of the shell 5. At its center, said wall is provided with an aperture through which a bolt 18 is passed, the porton of said wall about the aperture being countersunk to receive the tapered head of the bolt. The bolt extends through a hole in the slab 7 and through a central aperture of the plate 1. A tubular spacer 20 surrounds the bolt and is sustained by a nut 21 that is threaded onto the bolt before the lower end of the bolt is engaged through the aperture of the base 1. The spacer, in turn, serves to support the slab 7. Beyond the base 1, the bolt has applied to it a split washer 22 and a nut 23.

From the foregoing it will be seen that the parts may be very quickly and easily assembled. The heating coils and the terminal members 12 are first secured to the slab 7. The layer 17 of insulating material is placed within the shell 5 and this is followed by the self-contained electrical unit comprised of the slab 7 and parts carried thereby. The bolt 18 is then inserted through the aperture in the top wall of the shell and through the hole in the slab, the spacer 20 is placed over the bolt, and the nut 21 applied to bind the parts together. This assembly is then placed upon the base and the bolt projected through the central aperture thereof after which the washer 22 and the nut 23 are applied.

One edge of the base 1, preferably the one opposite that from which the connections 12 project, is provided with holes 25 through which the ends 26 of a wire handle 27 are adapted to be engaged in much the same manner as a stove lifter is applied to a stove lid. The handle is comprised of a yoke 28, of which the aforesaid ends 26 are integral parts, and coiled about the central member 29 of said yoke are the ends of a loop shaped grip portion 30. One of the extremities of said portion constitutes a stop 31 which serves to prevent depression of the grip portion with respect to the yoke 28 beyond a certain position in one direction, and the other extremity is shaped to form a stop 32 which engages a part of the yoke to maintain said grip portion in a substantially horizontal position over the stove, as shown in Fig. 3, where it may serve as a support for a piece of bread to be toasted.

From this disclosure it is apparent that our invention provides an inexpensive electric stove that is very simple of construction, is substantial and durable, is not likely to get out of order, involves no switch, and is adapted for use with standard terminal blocks, the block, by reason of the design and arrangement of the terminal members 12, serving as a switch for controlling the heat.

Having thus described our invention, what we claim is:

1. An electric stove comprising an inverted pan-shaped shell having a central aperture in its top wall and provided with depending lugs, a slab of insulating material having a central aperture, and situated below the top wall of the shell, an electrical heating element mounted upon said slab, insulating material disposed between said element and the top wall of the shell, a base comprised of a plate having an aperture, legs depending from said plate, a bolt extending through the apertures of the top, the slab and the base for binding the parts together, a sleeve surrounding the bolt and sustaining the slab, a nut on the bolt for supporting said sleeve, a plurality of elongated terminal members having their inner ends applied to the underside of the slab and their outer ends extended laterally beyond one side of the shell for the reception of a terminal block, and means extending through the slab for securing the terminal members to the slab and for establishing electrical connection between said members and the terminals of the heating element.

2. An electric stove comprising an inverted pan-shaped shell having lugs extending downwardly from its peripheral wall and having an aperture in its top wall, a slab of insulating material disposed within the upper portion of the shell and having an aperture aligned with the aforesaid aperture, an electric heating element mounted upon said slab, insulating material between said element and the top wall of the shell, three elongated terminal members having their inner ends applied to the underside of the slab, said members being extended downwardly adjacent one side of the shell and then laterally in a horizontal plane and terminating beyond the opposite side of the shell, the middle one of said members being extended further than the side ones, a base comprised of a plate having an aperture and legs depending from the base, a bolt extending through the apertures of the top wall of the shell, the slab and the base, a nut applied to the lower end of the bolt for binding the parts together, and a member on the bolt for sustaining the slab.

In testimony whereof, we hereunto affix our signatures.

ORLAND F. BAUGHMAN.
LAWRENCE W. CADY.